United States Patent
Hiraizumi et al.

(10) Patent No.: US 6,983,214 B2
(45) Date of Patent: Jan. 3, 2006

(54) FLOW RATE MEASURING METHOD AND FLOW-METER

(75) Inventors: Kenichi Hiraizumi, Ageo (JP); Atsushi Koike, Ageo (JP); Hiromitsu Miyajima, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 37 days.

(21) Appl. No.: 10/344,033

(22) PCT Filed: Aug. 10, 2001

(86) PCT No.: PCT/JP01/06923

§ 371 (c)(1),
(2), (4) Date: Feb. 6, 2003

(87) PCT Pub. No.: WO02/14799

PCT Pub. Date: Feb. 21, 2002

(65) Prior Publication Data

US 2003/0167837 A1    Sep. 11, 2003

(30) Foreign Application Priority Data

Aug. 10, 2000 (JP) ............................. 2000-243226

(51) Int. Cl.
*G01F 1/12* (2006.01)

(52) U.S. Cl. ................. 702/100; 702/45; 73/207.18

(58) Field of Classification Search ............. 702/45, 702/46, 47, 48, 100; 73/204.11, 204.12, 73/204.13, 204.14, 204.15, 204.16, 204.17, 73/204.18, 204.19, 204.2, 204.21, 204.22, 73/204.23, 204.24, 204.25, 204.26, 204.27
See application file for complete search history.

(56) References Cited

U.S. PATENT DOCUMENTS

| | | | | |
|---|---|---|---|---|
| 3,891,391 A | * | 6/1975 | Boone | ..................... 73/204.18 |
| 4,720,800 A | * | 1/1988 | Suzuki et al. | ................. 702/46 |
| 5,076,099 A | * | 12/1991 | Hisanaga et al. | ........ 73/204.18 |

FOREIGN PATENT DOCUMENTS

| | | |
|---|---|---|
| JP | 08-159838 A | 6/1996 |
| JP | 11-118566 A | 4/1999 |
| JP | 11-153466 A | 6/1999 |

OTHER PUBLICATIONS

Horowitz and Hill, The Art of Electronics, Cambridge University Press, 1989.*

* cited by examiner

*Primary Examiner*—Michael Nghiem
*Assistant Examiner*—Stephen J. Cherry
(74) *Attorney, Agent, or Firm*—Frommer Lawrence & Haug LLP; Ronald R. Santucci

(57) ABSTRACT

A flowmeter including a flow rate detection circuit including a thermal flow rate sensor (10) disposed in a measurement flow passage through which fluid to be measured passes, a temperature sensor circuit (12), a flow rate conversion circuit and a storage means EEPROM. The storage means stores, for respective discrete temperature values, a plurality of individual calibration curves indicating the relationship between electric outputs from the flow rate detection circuit and flow rates, and the individual calibration curves are prepared by using flow rates converted into those at a reference temperature. The flow rate conversion circuit performs interpolation based on temperatures measured by the temperature sensor circuit (12) and a plurality of individual calibration curves to obtain calibrated flow rate values corresponding to temperature at measuring.

11 Claims, 10 Drawing Sheets

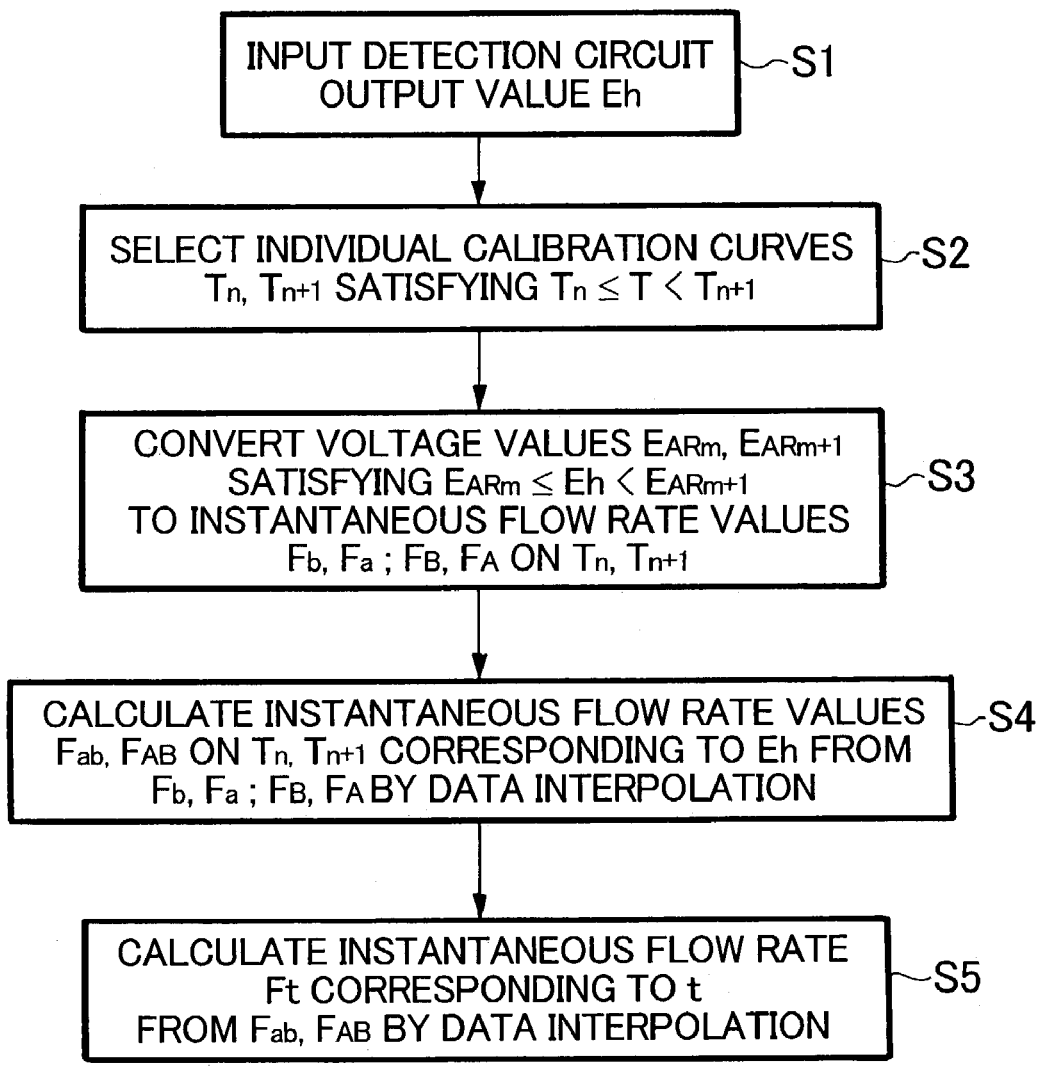

FLOW RATE MEASURING METHOD AND FLOW-METER

TECHNICAL FIELD

The present invention relates to a fluid flow rate measuring technique, and particularly to a flow rate measuring method and a flowmeter for measuring an instantaneous flow rate or integrated flow rate of fluid flowing in a pipe.

BACKGROUND TECHNIQUE

A flowmeter is used to measure the flow rate of fluid such as kerosene, water, gas or the like consumed at home or business enterprise. A thermal type (particularly, indirectly heated type) flow sensor which is easily reduced in cost has been used in the flowmeter.

There is known such an indirectly heated type flow sensor that a sensor chip comprising a thin film heating element and a thin film temperature-sensing element which are laminated through an insulating layer on a substrate by using a thin film technique is disposed so that heat transfer (that is, thermal interaction) is allowed between the sensor chip and fluid in a pipe (containing a fluid flow passage provided in a flowmeter so as to intercommunicate with an outer pipe). The temperature-sensing element is heated by making current flow into the heating element to vary the electrical characteristic, for example, the value of electrical resistance of the temperature-sensing element. The variation of the electrical resistance value (based on increase in temperature of the temperature-sensing element) is varied in accordance with the flow amount (flow rate) or flow velocity of fluid flowing in the pipe. This is because a part of the heating value of the heating element is transferred to the fluid, the heating value diffused into and absorbed by the fluid is varied in accordance with the flow amount (flow rate) or flow velocity to thereby vary the heating value to be supplied to the temperature-sensing element. Therefore, the electrical resistance value of the temperature-sensing element is varied. The variation of the electrical resistance value of the temperature-sensing element is made different in accordance with the temperature of the fluid. Therefore, there has been utilized such a manner that a temperature sensing element for temperature compensation is installed in an electrical circuit for measuring the variation of the electrical resistance value of the temperature-sensing element so that the variation of the measured flow-rate value due to the temperature of the fluid is suppressed to the minimum level.

Such an indirectly heated type flow sensor using a thin film element as described above is disclosed in JP-A-11-118566, for example. This flow sensor uses an electrical circuit containing a bridge circuit for achieving an electrical output corresponding to the flow rate of fluid.

In the flowmeter as described above, a fin plate for the heat exchange between the sensor chip and the fluid is projected into the fluid flow passage, and an electrical circuit portion containing a circuit board for calculating the flow rate, a display portion, a communication circuit connecting portion and other parts are disposed at the peripheral portion of the flow sensor, and all the function portions of the flowmeter containing the above parts are accommodated in the housing.

In a flowmeter using an indirectly heated type flow sensor, a part of the heating value occurring in the heating element (heater) is transmitted to the fluid, and on the basis of the fact that heat absorption is performed in accordance with the flow rate or flow velocity of the fluid, the output value of the electrical circuit which corresponds to the heat absorption amount is converted to the flow rate value by using a calibration curve. The calibration curve is achieved on the basis of an experiment or the like which was beforehand performed on fluid to be subjected to the flow-rate measuring. Accordingly, when the fluid to be subjected to the flow rate measuring and environmental conditions in the flow rate measuring are the same as those used when the calibration curve was created, substantially no error occurs in the flow-rate measuring when the conversion using the calibration curve is carried out.

However, the fluid formed of mixture of plural kinds of molecules having different molecular weights such as kerosene or the like is varied in volume in accordance with the temperature. Therefore, an error may be contained in a flow rate value achieved by the conversion using a calibration curve when the detection was carried out at a temperature different from that when the calibration curve concerned was created.

Therefore, the present invention has an object to perform flow-rate measuring having little measurement error even when the volume of fluid is varied due to variation of the temperature. Particularly, the present invention has an object to provide a method and a flowmeter for the flow-rate measuring as described above.

DISCLOSURE OF THE INVENTION

According to the present invention, in order to attain the above object, there is provided a flow rate measuring method of measuring a flow rate of fluid by making the fluid under measuring flow into a measuring fluid flow path, achieving the electrical output corresponding to the flow rate of the fluid under measuring in the measuring fluid flow path by an electrical circuit constructed so as to contain a thermal type flow sensor disposed in the measuring fluid flow path by utilizing the fact that a heat absorption amount from the thermal type flow sensor to the fluid under measuring corresponds to the flow rate of the fluid under measuring in the measuring fluid flow path, and converting the electrical output corresponding to the flow rate to a flow-rate value by using pre-created calibration curves, wherein:

plural individual calibration curves indicating the relationship between the electrical output of the electric circuit and the flow rate every discrete temperature value are used as the calibration curves, flow rates which are converted to those at a reference temperature are used when the individual calibration curves are prepared, a temperature measurement is carried out, and interpolation calculation is carried out on the basis of the measured temperature and the plural individual calibration curves to achieve a corrected flow rate value corresponding to the temperature at the measurement time.

In an embodiment of the flow rate measuring method of the present invention, each of the individual calibration curves is prepared for discrete values out of achievable electrical outputs of the electrical circuit, and the flow rate value corresponding to the temperature at the measurement time is achieved by the interpolation calculation.

Furthermore, according to the present invention, in order to attain the above object, there is provided a thermal type flowmeter, comprising a measuring fluid flow path through which fluid under measuring flows, a thermal type flow sensor disposed in the measuring fluid flow path, a flow rate detection circuit constructed so as to contain the thermal type flow sensor, temperature measuring means, flow rate conversion circuit and storage means, wherein plural individual calibration curves indicating the relationship between the electrical output of the flow rate detection circuit and the flow rate every discrete temperature value are stored as calibration curves in the storage means, the individual calibration curves are prepared by using flow rates which are converted to those at a reference temperature, and the flow rate conversion circuit carries out an interpolation calculation on the basis of the temperature measured by said temperature measuring means and the plural individual calibration curves to achieve a corrected flow rate value corresponding to the temperature at the measurement time.

In an embodiment of the thermal type flowmeter of the present invention, the thermal type flow sensor has a fin plate that is projected to the measuring fluid flow path and used for thermal interaction with the fluid under measuring.

In an embodiment of the flow rate measuring method or the thermal type flowmeter of the present invention, the fluid under measuring is a mixture of plural kinds of molecules different in molecular weight, for example, kerosene. In an embodiment of the flow rate measuring method or the thermal type flowmeter of the present invention, the reference temperature is set to a temperature in the range from 14 to 16° C.

The reason why the flow rate measuring precision is enhanced by the present invention as described above will be described hereunder.

As an examination result of the volume variation due to temperature variation for various kinds of kerosene, the following matters have been discovered. That is, it has been found that, for four kinds of kerosene (kerosene sold by each of four companies), when the temperature varies, the volume also varies and this variation has a substantially linear relationship with the volume at 15° C. set as a reference (1.00) as shown in FIG. 1. This indicates that with respect to kerosene formed of mixture of plural kinds of molecules different in molecular weight, the volume variation due to the temperature variation is substantially equal among these kinds of molecules even when there is some difference in composition.

Therefore, according to the present invention, plural kinds of individual calibration curves which are prepared every discrete temperature value by using flow rates which are converted to those at a reference temperature are used as calibration curves, and the interpolation calculation is carried out on the basis of the individual calibration curves and the measured temperature to achieve the corrected flow rate value corresponding to the measured temperature, thereby enhancing the flow rate measuring precision.

BRIEF DESCRIPTION OF THE DRAWINGS

FIG. 11 is a flowchart showing the operation of a flow rate conversion circuit of the flowmeter according to the present invention.

BEST MODE FOR CARRYING OUT THE INVENTION

Figure 1:
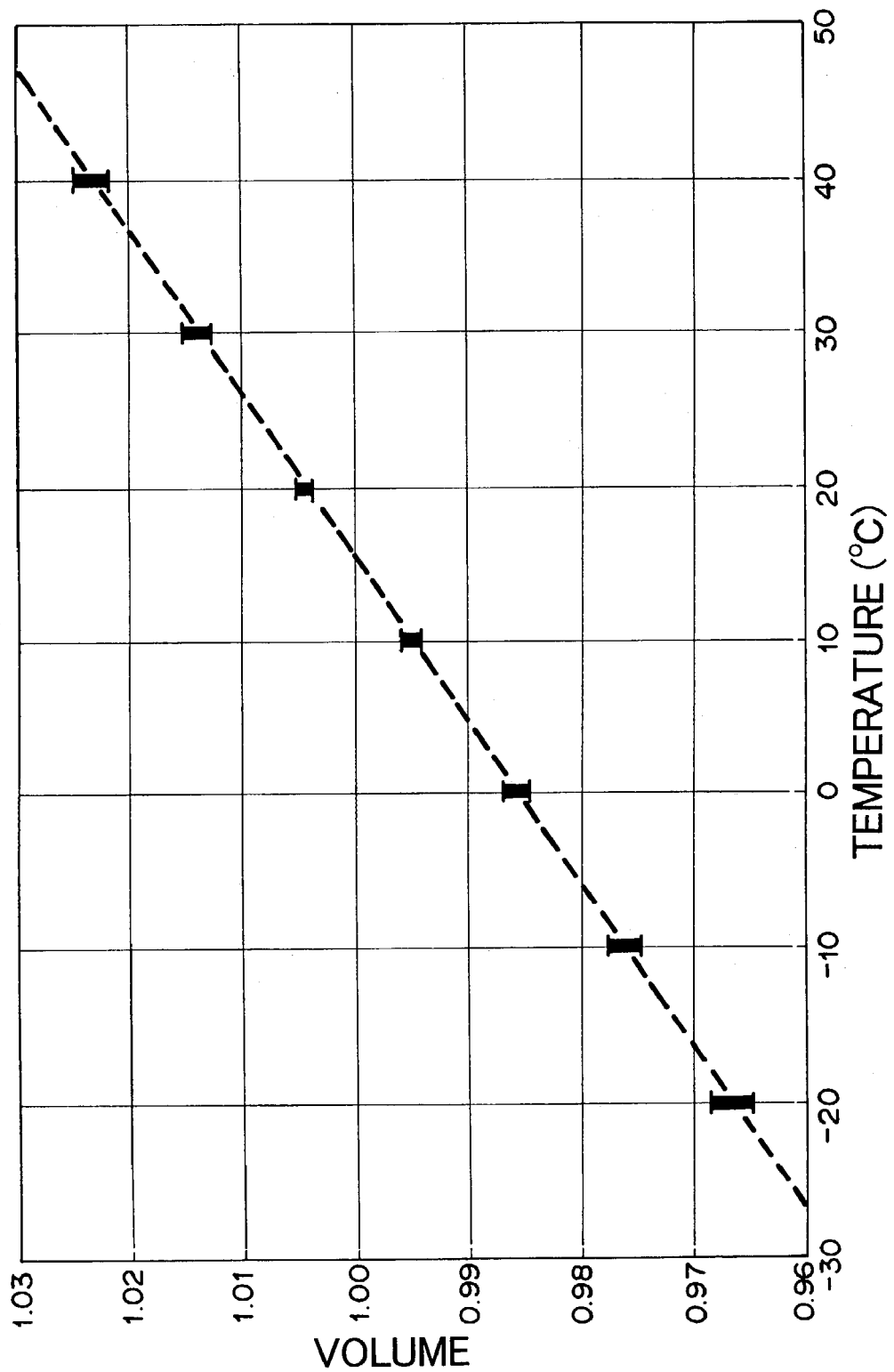
FIG. 1 is a graph showing the relationship between the temperature and volume of kerosene.

An embodiment of the present invention will be described with reference to the drawings.

FIGS. 2 to 6 are diagrams showing an embodiment of a flowmeter according to the present invention. A housing of the flowmeter contains a main body member 2 and an outer lid member 4. The main body member 2 is formed of die-casting of aluminum, zinc or the like, and an outer lid member 4 formed of die-casting of aluminum, zinc or the like is fitted to the housing main body member 2 in a specific direction (direction of an arrow A) by screws. A fluid inlet pipe 21 is formed at one side portion of the housing main body member 2, and a fluid outlet pipe 22 is formed at the other side portion thereof. The housing main body member 2 has two compartments formed therein. One compartment corresponds to a recess portion 23 for a reservoir portion at the upper side, and the other compartment corresponds to a recess portion 24 for circuit elements at the lower side. The recess portion 23 for the reservoir portion is defined by the inner wall 26.

The outer peripheral surface of an inner lid member 6 formed of die-casting of aluminum, zinc or the like is fitted to the end face of the inner wall 26 in the direction of the arrow A by screws so as to close the recess portion 23 for the reservoir portion. When the fitting is performed, a rubber seal (cork-added rubber seal, etc.) is interposed to prevent leakage of fluid from the fitting portion, whereby a fluid reservoir portion in which fluid is temporarily stocked and through which the fluid flows is formed between the housing main body member 2 and the inner lid member 6. An opening 21a which intercommunicates with the fluid inlet pipe 21 and opens at the recess portion 23 for the reservoir portion is formed in the housing main body member 2, and a connection opening 22a which intercommunicates with the fluid outlet pipe 22 and opens at the recess portion 23 for the reservoir portion is formed in the housing main body member 2.

A flow-rate measuring portion 8 to be disposed in the fluid reservoir portion is attached to the inner lid member 6. A fluid flow path or fluid flow passage 81 for measuring the flow rate of the fluid is formed in the flow rate measuring portion 8. An entrance of the fluid flow path 81 is located on the lower surface of the flow rate measuring portion 8 so as to open at the fluid reservoir portion. A joint member 8a projecting in the direction of the arrow A is fixed to the exit of the measuring fluid flow path 81, and the joint member 8a is connected to the connection opening 22a of the housing main body member 2 by fitting the inner lid member 6 to the housing main body 2, whereby the exit of the measuring fluid flow path 81 of the flow rate measuring portion 8 and the fluid output pipe 22 are made to intercommunicate with each other.

Figure 7:
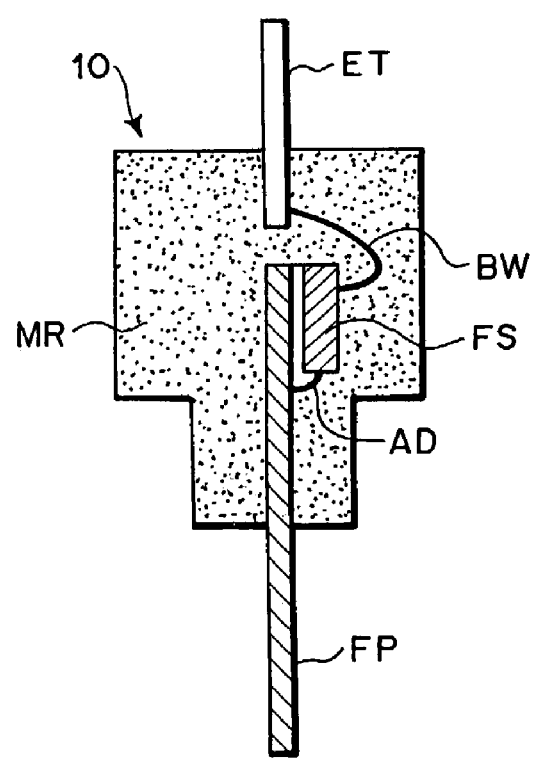
FIG. 7 is a cross-sectional view showing a flow sensor.

A thermal type flow sensor 10 is inserted in a sensor mount hole 8b formed in the direction of the arrow A in the flow rate measuring portion 8 (the thermal type flow sensor 10 will be described later with reference to FIG. 7). The thermal type flow sensor 10 has a fin plate FP serving as a heat transfer member for heat exchange and external electrode terminals ET, and the fin plate FP is projected into the fluid flow path.

A fluid flow path defining member 9 is secured to the inner lid member 6. The fluid flow path defining member 9 defines the flow path of the fluid flowing from the opening 21a in the fluid reservoir portion by fitting the inner lid member 6 to the housing main body member 2. The fluid flow path defining member 9 leads the flow-in fluid downwards and then leads the fluid through the opening formed between the lower edge of the flow path defining member 9 and the bottom surface of the fluid reservoir portion to an area where the flow rate measuring portion 8 is disposed.

Figure 2:
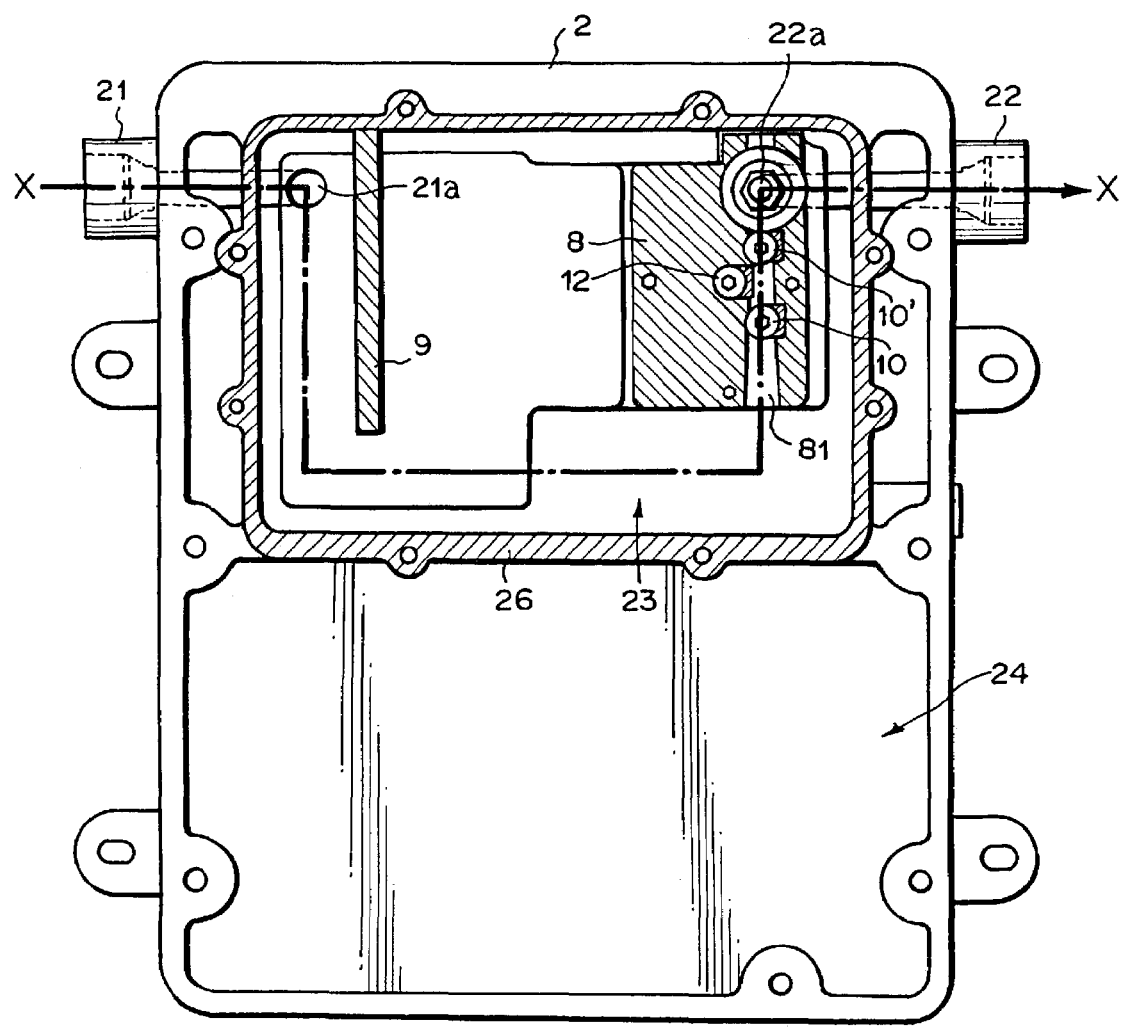
FIG. 2 is a cross-sectional view showing an embodiment of a flowmeter according to the present invention.

In FIG. 2 and other figures, it is shown that the measuring fluid flow path 81 of the flow rate measuring portion 8 extends in the up-and-down direction. The opening at the lower end of the measuring fluid flow path 81 is set as a fluid entrance, and the opening at the upper end thereof is closed by the inner wall surface of the housing main body member 2 by fitting the inner lid member 6 to the housing main body member 2. Just below the upper end of the measuring fluid flow path 81, a horizontal hole extending in the direction of the arrow A is formed in the flow rate measuring portion 8, and it is set as a fluid exit 81a. The fluid exit 81a and the connection opening 22a at the housing main body member (2) side are located at the corresponding positions in the direction A of the arrow A, and a flow path joint 8a is disposed through O-rings between the fluid exit 81a and the connection opening 22a.

Two sensor insertion holes 8b intercommunicating with the measuring flow path 81 are formed in the flow rate measuring portion 8. The flow sensor 10 is inserted in one of the sensor insertion holes 8b through an O-ring and the fluid temperature detecting sensor 10' is inserted in the other sensor insertion hole 8b through an O-ring. The flow sensor 10 may be formed by joining a fin plate FP and the flow rate detection portion FS to each other with joint member AD having excellent thermal conductivity, bonding the electrode pads of the flow rate detection portion FS to the external electrode terminals ET through bonding wires BW and sealing the result thus achieved with mold resin MR. The fluid temperature detecting sensor 10' may use a fluid temperature detecting portion in place of the flow rate detection portion in the flow sensor 10 and equipping the external electrode terminals ET corresponding to the fluid temperature detecting portion. As the flow rate detection portion and the fluid temperature detecting portion, devices disclosed in JP-A-11-118566 may be used.

Figure 3:
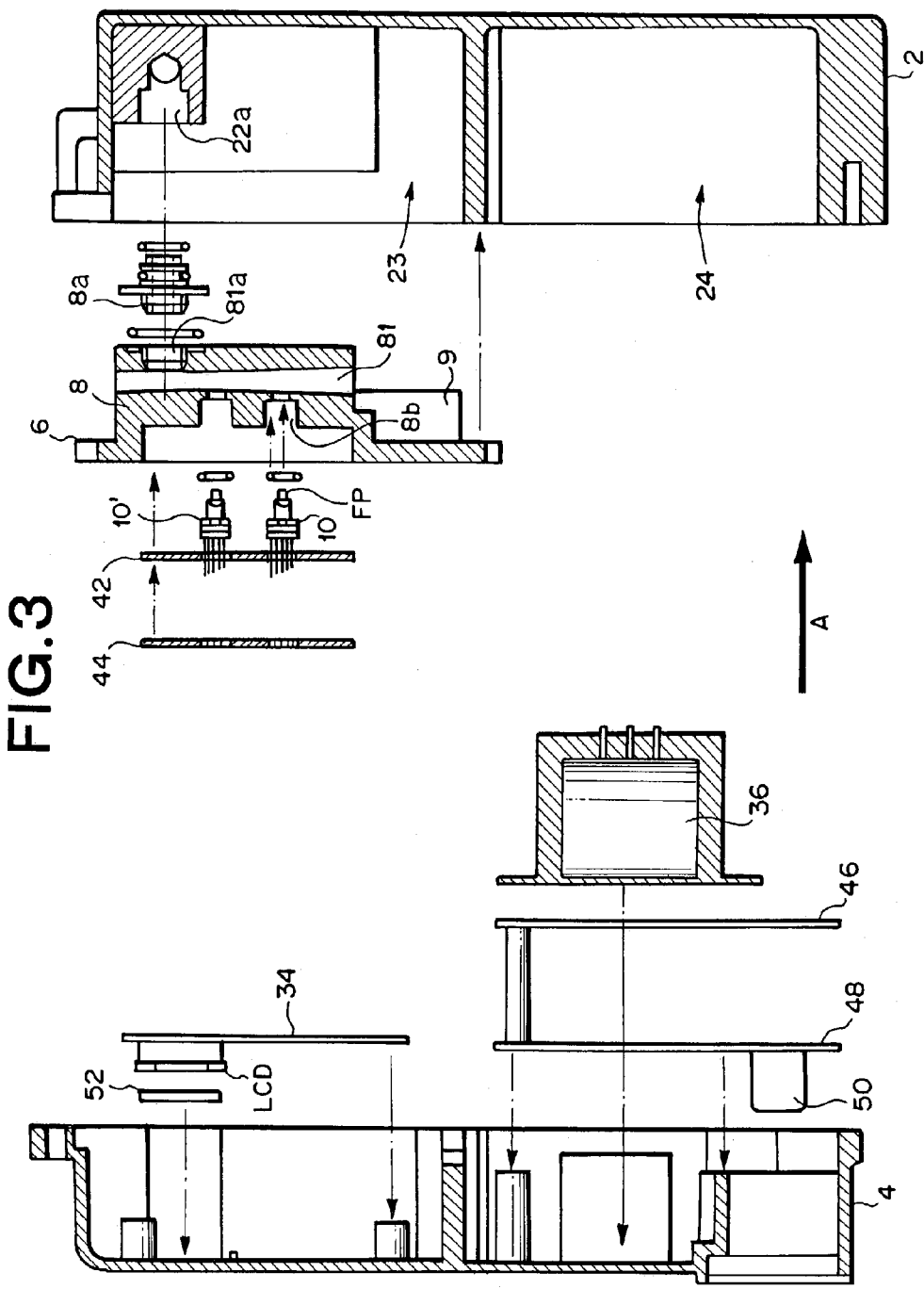
FIG. 3 is an exploded cross-sectional view showing the embodiment of the flowmeter according to the present invention.
Figure 4:
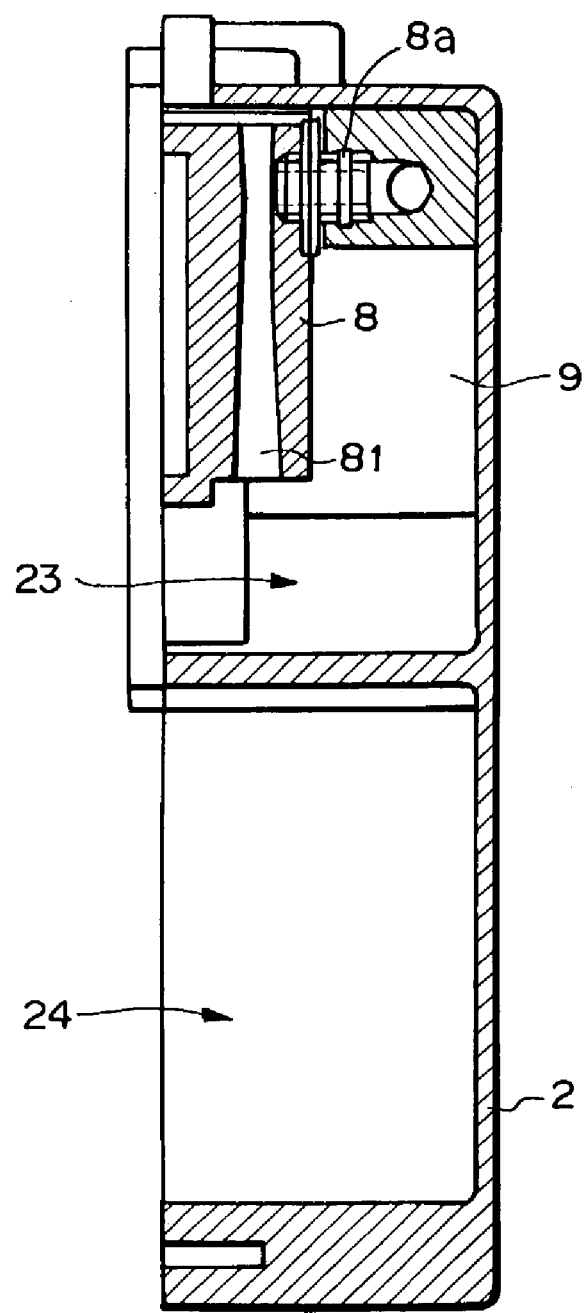
FIG. 4 is a cross-sectional view showing the embodiment of the flowmeter according to the present invention.

Furthermore, as shown in FIG. 3, a temperature sensor 12 for detecting the temperature of the fluid in the measuring fluid flow path 81 is disposed in the flow rate measuring portion 8. The flow rate measuring portion 8 is excellent in thermal conductivity, and thus the temperature thereof is substantially equal to the temperature of the fluid in the measuring flow path 81. Accordingly, the fluid temperature measurement can be performed by measuring the temperature of the flow rate measuring portion 8 in the neighborhood of the measuring fluid flow path 81 by the temperature sensor 12.

These sensors 10, 10', 12 are positionally fixed by a press member 42, and an analog circuit board 44 is disposed on the press member 42. The analog circuit board 44 is electrically connected to the external electrode terminals ET of the flow sensor 10 and the fluid temperature detecting sensor 10'.

To the outer lid member 4 are connected a digital circuit board 34 constituting the flow rate detection circuit in combination with the analog circuit board 44, a transformer 36 constituting a power supply circuit portion and power supply boards 46, 48 serving as an input/output terminal portion of the flowmeter. Furthermore, a power supply cable fixing terminal 50 is secured to the power supply board 48. Particularly, the transformer 36 and the input/output terminal portion are disposed in the recess portion 24 for the circuit members. A liquid crystal display device LCD is secured to the digital circuit board 34, and an instantaneous flow rate value or an integrated flow rate value displayed as digital values can be observed from the outside through a cover plate 52.

Figure 5:
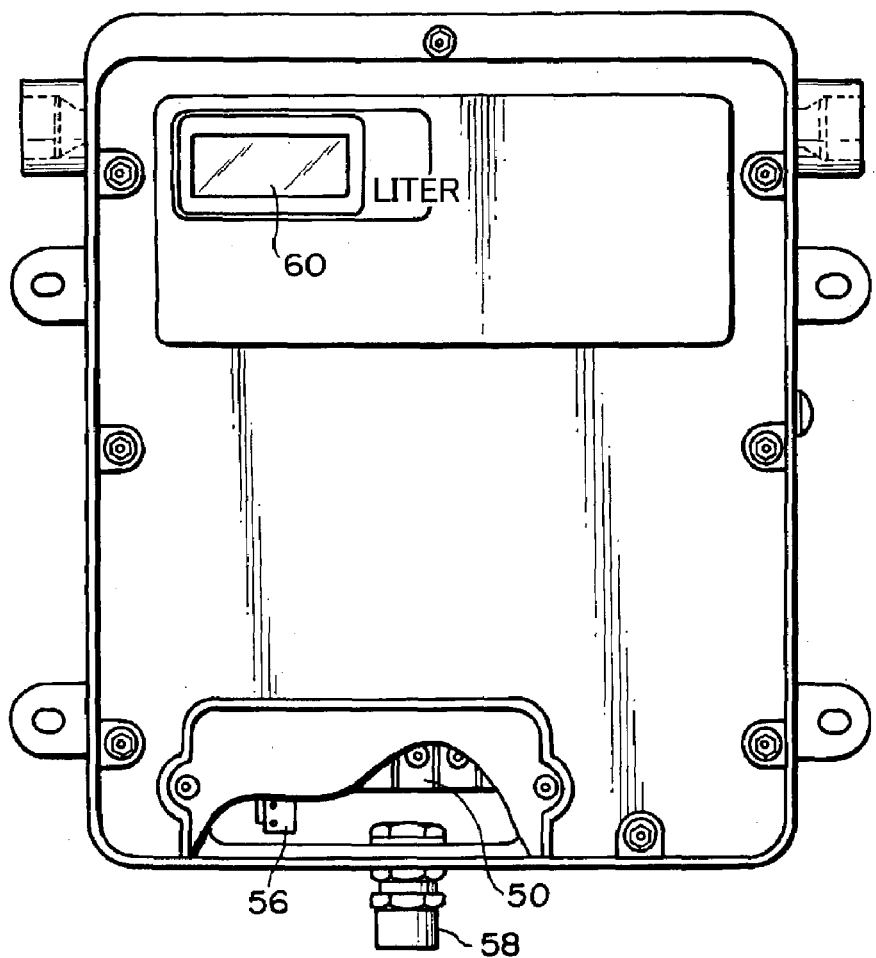
FIG. 5 is a front view showing the embodiment of the flowmeter according to the present invention.
Figure 6:
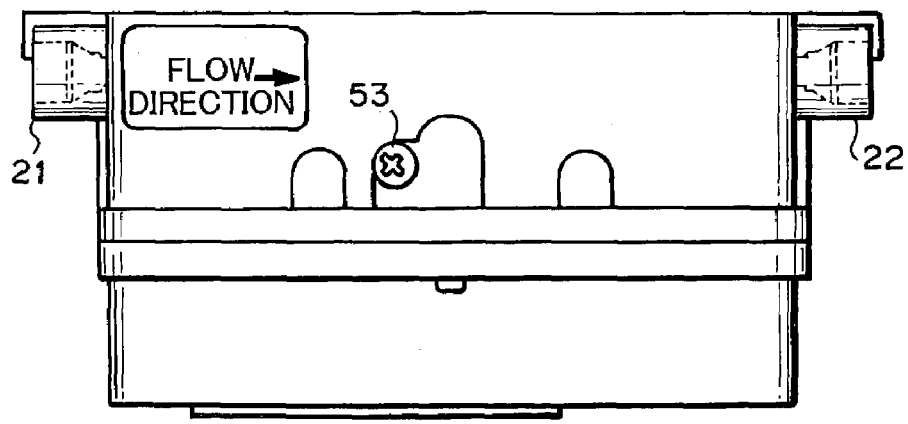
FIG. 6 is a plan view showing the embodiment of the flowmeter according to the present invention.

FIGS. 5 and 6 mainly show the front-view outlook and the plan-view outlook, respectively. A screw 53 for venting air in the fluid reservoir portion is detachably secured to the upper surface portion of the housing main body member 2. Unnecessary air remaining at the upper portion of the reservoir portion can be discharged by detaching this screw 53. In addition to the power supply cable fixing terminal 50, a communication cable connector 56 is disposed in the housing main body member 2. A bush 58 for the power supply cable is secured to the lower surface portion of the housing main body member 2. A display portion 60 using the liquid crystal display device LCD is disposed at the front side portion of the housing main body member 2.

In the above embodiment, the fluid supplied from a fluid supply source (not shown) through a pipe is passed from the fluid inlet pipe 21 through the opening 21a into the fluid reservoir portion. The fluid thus supplied first goes to the bottom portion of the fluid reservoir portion along a downwardly-extending fluid passage defined by the flow path defining member 9, and reaches the area where the flow rate measuring portion 8 is disposed. The level of the fluid thus stocked gradually rises up in the reservoir portion, and finally the flow rate measuring portion 8 is perfectly immersed in the fluid. At this time, the fluid intrudes into the measuring fluid flow path 81. The fluid thus intruding into the measuring fluid flow path 81 is passed through the connection opening 22a and discharged from the fluid outlet pipe 22, and then supplied to fluid demanding equipment (not shown). Afterwards, if there is any fluid demand at the fluid demanding equipment side, the fluid is supplied from the fluid supply source to the fluid demanding equipment through the inside of the reservoir portion of the flowmeter, particularly the measuring fluid flow path 81. The main flow path of the fluid in the flowmeter as described above is indicated by an arrow X in FIG. 2. A filter for removing foreign matters in the fluid may be equipped in the flow path of the flow reservoir portion, for example, at the lower portion of the flow path defining member 9.

Figure 8:
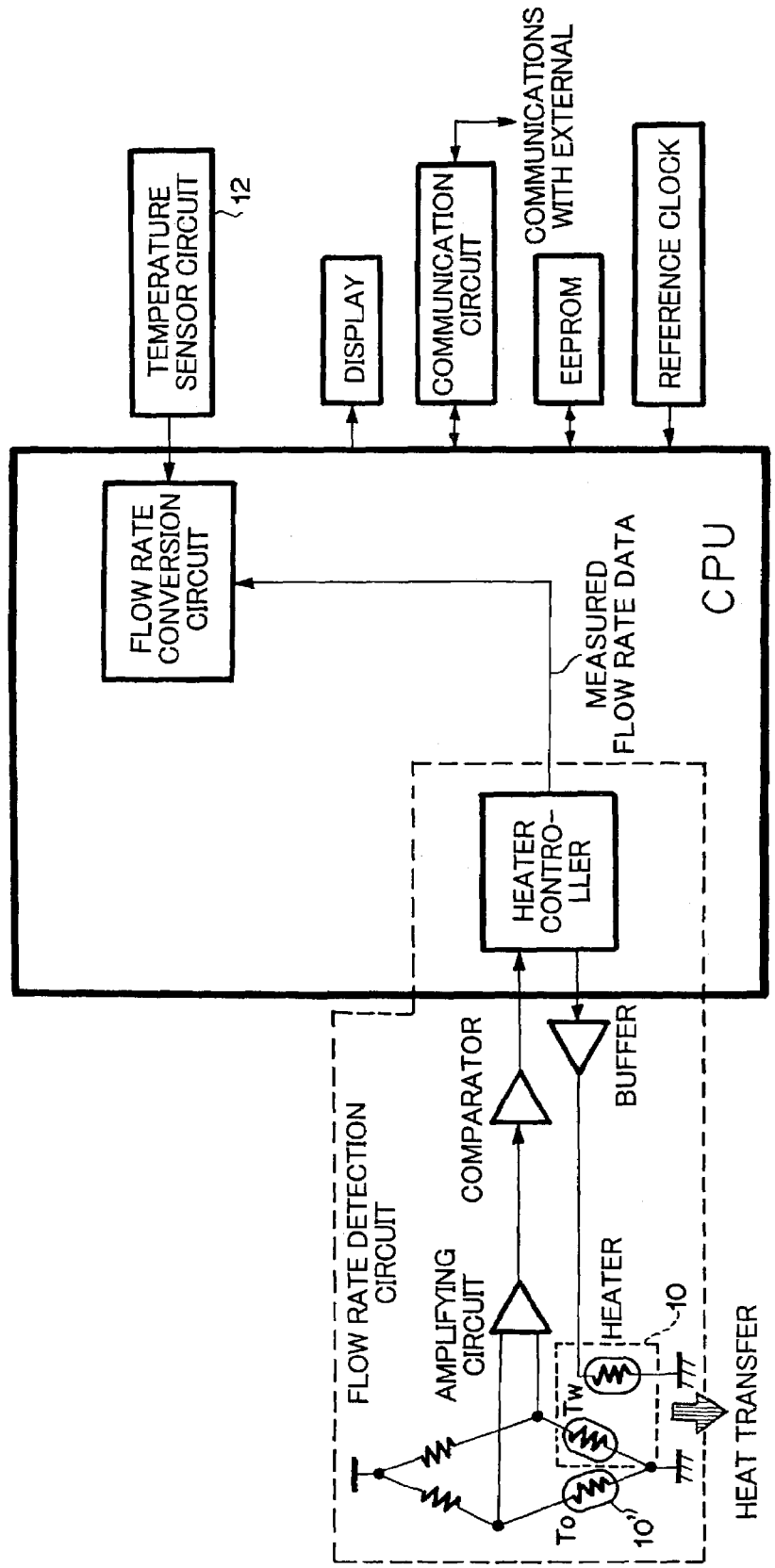
FIG. 8 is a block diagram showing the construction of an electrical circuit portion of the flowmeter according to the present invention.

The flow rate of the fluid in the measuring fluid flow path 81 is measured by using the flow rate detection circuit as shown in FIG. 8 which contains the flow sensor 10 and the fluid temperature detecting sensor 10'. In FIG. 8, the flow rate detection circuit contains the flow rate sensor 10 and the fluid temperature detecting sensor 10'. In the flow sensor 10, a heater and a temperature sensing resistor Tw are laminated through an insulating film to form a flow rate detector, and a part of the heating value of the heater is transferred through the fin plate FP to the fluid flowing in the fluid flow path 81. The temperature sensing effected by the thermal interaction with the fluid is executed by the temperature sensing resistor Tw. The two resistors of the temperature sensing resistor Tw and the temperature sensing resistor To of the fluid temperature detector of the fluid temperature detecting sensor 10' constitute a bridge circuit. The output of the bridge circuit is amplified by an amplifying circuit and then compared with a predetermined value in a comparator, and the output of the comparator is input to a heater controller. The heater controller controls the heating of the heater of the flow sensor 10 through a buffer according to an input signal. This control is performed so that the temperature sensing resistor Tw of the flow sensor 10 keeps a predetermined temperature sensing state, that is, the input signal to the heater controller is kept to a predetermined value. This control state supports the instantaneous flow rate, and the data thereof (measured flow rate data) is input to a flow rate conversion circuit.

A signal indicating the fluid temperature is input from a temperature sensor circuit containing the temperature sensor 12 to the flow rate conversion circuit.

In the flow rate conversion circuit, the operation and the conversion are carried out on the basis of the flow rate data input from the flow rate detection circuit and the fluid temperature data input from the temperature sensor circuit to achieve the flow rate of the fluid under measuring.

A display portion, a communication circuit, EEPROM and reference clocks are connected to CPU containing the flow rate conversion circuit as described. Data required for the operation are stored in EEPROM serving as a memory.

The method for the operation and the conversion to the flow rate which are executed in the flow rate conversion circuit will be described.

Figure 9:
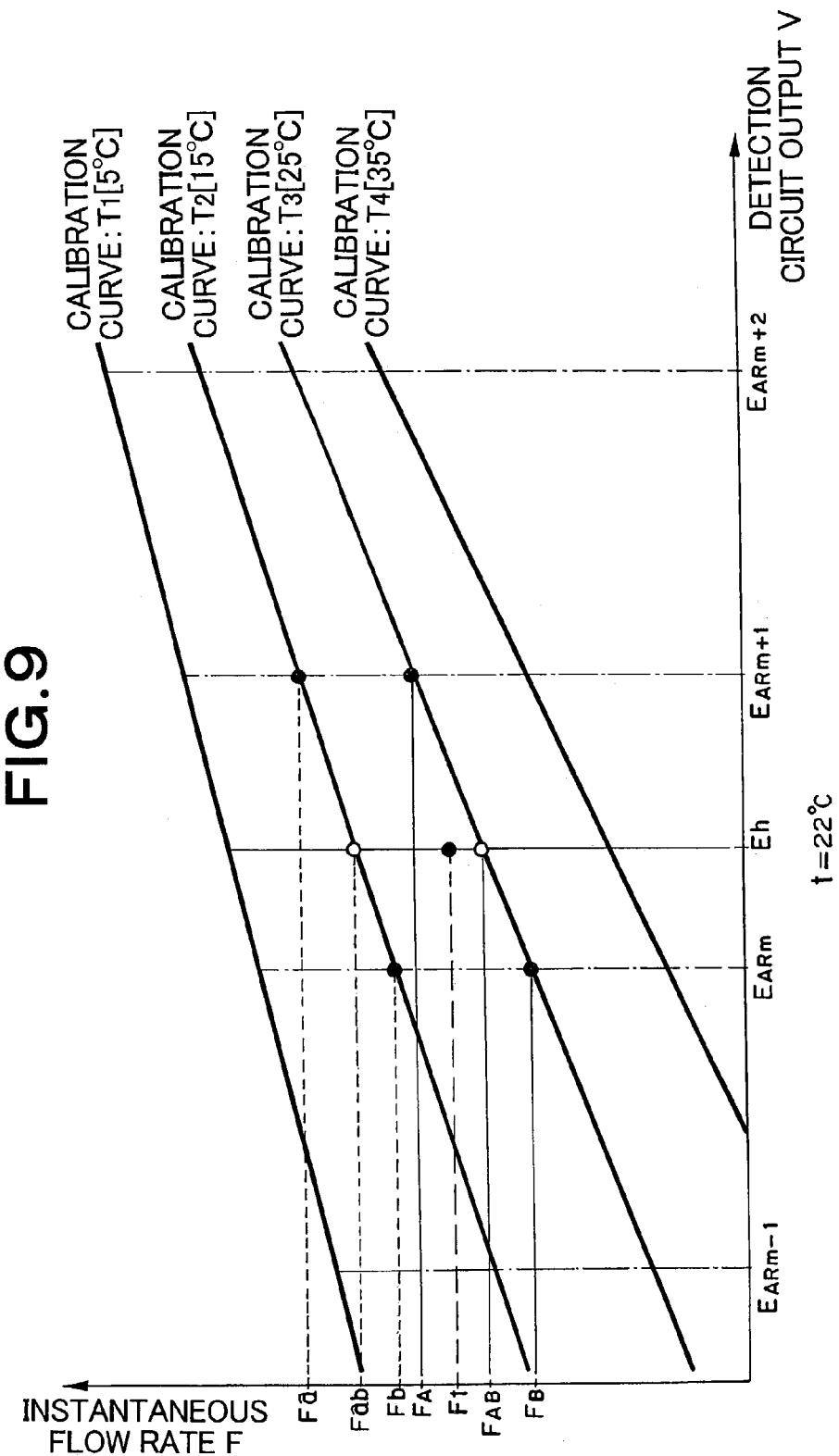
FIG. 9 is a graph showing calibration curves for kerosene.

FIG. 9 shows calibration curves for kerosene which are stored in a memory serving as storage means in advance. The calibration curves (instantaneous flow rate conversion table) correspond to a data table indicating the relationship between the instantaneous flow rate and the output of the flow rate detection circuit which corresponds to the integrated value of a voltage applied to the heater for 0.5 second, and it comprises plural individual calibration curves prepared every discrete temperature. Individual calibration curves $T_1$ to $T_4$ for discrete temperatures $T_1$ to $T_4$ (5° C., 15° C., 25° C. and 35° C.) are shown in FIG. 9. In FIG. 9, each calibration curve is illustrated as a continuous line. However, this illustration is for convenience's sake of description, and actually, it shows the corresponding relationship between the discrete output voltage values ... $E_{ARm-1}$, $E_{ARm}$, $E_{ARm+1}$, $E_{ARm+2}$, ... of the flow rate detection circuit shown in FIG. 9 and the instantaneous flow rates.

Figure 10:
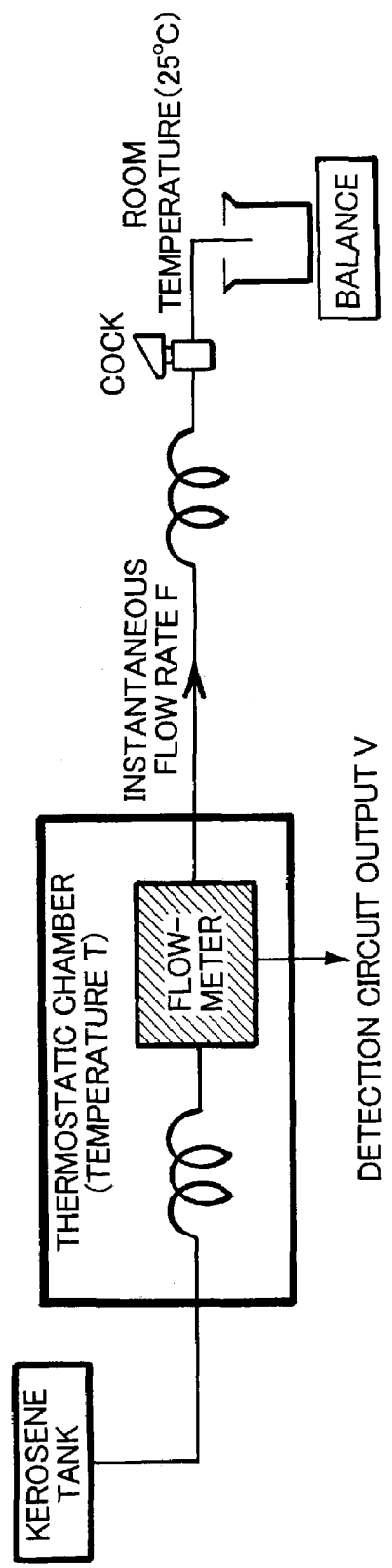
FIG. 10 is a diagram showing preparation of calibration curves.

A method of preparing the individual calibration curves as described above will be described with reference to FIG. 10.

Kerosene is supplied from a kerosene tank through a pipe. A cock is attached to the pipe in the neighborhood of the tip opening portion, and the kerosene is supplied from the tip opening portion into a measuring container disposed on a balance by opening the cock. The weight of the kerosene supplied into the measuring container is measured by the balance. The pipe is disposed to extend through a thermostatic chamber, and the pipe portion in the thermostatic chamber is designed in a coil shape. In the thermostatic chamber, a flowmeter is fixed to the pipe portion subsequent to the coil-shaped pipe portion. The temperature in the thermostatic chamber is set to T, and kerosene which is passed through the coil-shaped pipe portion and kept to the temperature T is passed through the flowmeter.

The flow rate of kerosene in the pipe is adjusted by adjusting the opening degree of the cock, and the weight of kerosene supplied to the measuring container within a measuring time is measured by the balance. Thereafter, F=(measured weight of kerosene)/(the specific gravity of kerosene at a reference temperature [for example, 15° C.])/ (measuring time) is achieved as the value of the instantaneous flow rate. Accordingly, the instantaneous flow rate F is a value which is converted to the flow rate at the reference temperature. Besides, the output V of the detection circuit of the flowmeter at this time is measured. The same measurements are carried out by varying the opening degree of the cock variously to achieve individual calibration curves at the temperature T.

Such a measurement is carried out on some discrete values of the temperature T in the thermostatic chamber (5° C., 15° C., 25° C. and 35° C. in the case of FIG. 9) to achieve plural individual calibration curves as shown in FIG. 9.

In the flow rate measuring operation, the temperature value T is input from the temperature sensor circuit to the flow rate conversion circuit. In the flow rate conversion circuit, the data interpolation calculation is carried out according to the procedure shown in FIG. 11 on the basis of the detection circuit output V and the temperature value T by using the plural individual calibration curves as shown in FIG. 9 in the flow rate conversion circuit to achieve instantaneous flow rates F.

That is, the value Eh of the detection circuit output is input (S1).

Subsequently, for the temperature T measured (22° C. in the case of FIG. 9), individual calibration curves $T_n$, $T_{n+1}$ satisfying $T_n \leq T < T_{n+1}$ (n=2 in the case of FIG. 9; that is, $T_2[=15°$ C.], $T_3[=25°]$) are selected (S2).

Subsequently, voltage values $E_{ARm}$, $E_{ARm+1}$ satisfying $E_{ARm \leq Eh < EARm+1}$ are achieved, and then the voltage values $E_{ARm}$, $E_{ARm+1}$ are converted to the instantaneous flow rate values $F_b$, $F_a$; $F_B$, $F_A$ on the individual calibration curves $T_n$, $T_{n+1}$ (S3).

Subsequently, the instantaneous flow rate values $F_{ab}$, $F_{AB}$ on the $T_n$, $T_{n+1}$ which correspond to Eh are achieved from $F_b$, $F_a$; $F_B$, $F_A$ by the data interpolation calculation. At this time, the following equations (1), (2) are used (S4):

$$F_{ab}=(F_a-F_b)\cdot(Eh-E_{ARm})/(E_{ARm+1}-E_{ARm})+F_b \quad (1)$$

$$F_{AB}=(F_A-F_B)\cdot(Eh-E_{ARm})/(E_{ARm+1}-E_{ARm})+F_B \quad (2)$$

Subsequently, the instantaneous flow rate value Ft corresponding to Eh for the temperature T is achieved from $F_{ab}$, $F_{AB}$ by the data interpolation calculation. At this time, the following equation (3) is used (S5):

$$Ft=(F_{ab}-F_{AB})\cdot(t-T_3)/(T_2-T_3)+F_{AB} \quad (3)$$

The instantaneous flow rate value Ft at the temperature T at the measurement time is achieved by carrying out the data interpolation calculation as described above. Therefore, the data volume of the individual calibration curves can be reduced. In addition, since the flow rate thus achieved is the value which has been converted to one for the reference temperature (corrected value), the instantaneous flow rate measurement can be performed with an extremely small measurement error.

An operation of integrating the instantaneous flow rate values thus achieved to achieve an integrated flow rate value is also carried out in CPU. The flow rate outputs such as the instantaneous flow rate value and the integrated flow rate value thus achieved are displayed by the display portion. The instantaneous flow rate value and the integrated flow rate value may be stored in a memory as occasion demands on the basis of an instruction from CPU. Furthermore, they may be transmitted to the external through a communication line such as a telephone line or other networks.

When the consumption amount of kerosene is measured, it is preferable from the viewpoint of intended use of kerosene that the measurement amount thereof corresponds to the heating value occurring in combustion of kerosene as much as possible, and in this sense, the flow rate measurement of the embodiment of the present invention for more accurately measuring the amount of substance of kerosene, not the volume of kerosene is preferable.

INDUSTRIAL APPLICABILITY

As described above, according to the flow rate measuring method and the flowmeter of the present invention, the flow rate measuring having little measuring error can be performed even when fluid under measuring suffers volumetric variation due to temperature variation.

What is claimed is:

1. A method of measuring a flow rate of fluid by:
moving the fluid within a fluid flow path,
measuring an electrical output corresponding to the flow rate of the fluid within the flow path by utilizing an electrical circuit having a thermal type flow sensor disposed in the fluid flow path and by measuring heat absorption of the fluid with the thermal type flow sensor,
measuring a temperature of the fluid,
converting a value of the electrical output to a value of the flow-rate by utilizing a plurality of predetermined calibration curves $T_1$ to $T_k$ (k is an integer greater than 1):
indicating a relationship between the electrical output of the electrical circuit and the flow rate of the fluid at a plurality of discrete temperature values $t_1$ to $t_k$ respectively, each of the calibration curves having discrete flow rate values in response to discrete electrical output values $E_{AR1}$ to $E_{ARj}$ (j is an integer greater than 1), and
achieving a corrected flow rate value $F_t$ corresponding to the temperature at the time of measurement on the basis of a value of the measured temperature and the calibration curves by interpolation calculation,
wherein the interpolation calculation is carried out on the basis of a value of the measured electrical output and a measured temperature value t by using the calibration curves $T_n$, $T_{n+1}$ (n is an integer smaller than k−1) satisfying $t_n \leq t < t_{n+1}$ to achieve flow rate values $F_{ab}$, $F_{AB}$, which correspond to the measured electrical output value $E_h$ by using the following equations (1), (2):

$$F_{ab}=(F_a-F_b)\cdot(E_h-E_{ARm})/(E_{ARm+1}-E_{ARm})+F_b \quad (1)$$

$$F_{AB}=(F_A-F_B)\cdot(E_h-E_{ARm})/(E_{ARm+1}-E_{ARm})+F_B \quad (2)$$

wherein m is an integer smaller than j−1, electrical output values $E_{ARm}$, $E_{ARm+1}$ satisfy $E_{ARm} \leq E_h \leq E_{ARm+1}$, and $F_b$, $F_a$ are flow rate values on the calibration curve $T_n$ for the electrical output values $E_{ARm}$, $E_{ARm+1}$ respectively, and $F_B$, $F_A$ are flow rate values on the calibration curve $T_{n+1}$ for the electrical output values $E_{ARm}$, $E_{ARm+1}$ respectively,
and to achieve the corrected flow rate value $F_t$ corresponding to the measured electrical output value $E_h$ for the measured temperature value t by using the following equation (3):

$$F_t=(F_{ab}-F_{AB})\cdot(t-t_{n+1})/(t_n-t_{n+1})+F_{AB} \quad (3).$$

2. The flow rate measuring method as claimed in claim 1, wherein the fluid is a mixture comprising a plurality of molecules that have different molecular weights.

3. The flow rate measuring method as claimed in claim 2, wherein the fluid is kerosene.

4. The flow rate measuring method as claimed in claim 1, wherein the discrete temperature values are in the range from 14 to 16° C.

5. The flow rate measuring method as claimed in claim 1, wherein said relationship graphically represents the plurality of predetermined calibration curves.

6. A thermal type flowmeter for measuring a flow rate of fluid, said flowmeter comprising:
a fluid flow path through which the fluid moves,
a thermal type flow sensor disposed in the fluid flow path,
a flow rate detection circuit having said thermal type flow sensor,
temperature measuring means,
a flow rate conversion circuit, and
storage means,
achieving a corrected flow rate value $F_t$ corresponding to the temperature at the time of measurement on the basis of a value of the measured temperature and the calibration curves by interpolation calculation,
wherein the interpolation calculation is carried out on the basis of a value of the measured electrical output and a measured temperature value t by using the calibration curves $T_n$, $T_{n+1}$ (n is an integer smaller than k−1) satisfying $t_n \leq t < t_{n+1}$ to achieve flow rate values $F_{ab}$, $F_{AB}$, which corresponded to the measured electrical output value $E_h$ by using the following equations (1), (2):

$$F_{ab}=(F_a-F_b)\cdot(E_h-E_{ARm})/(E_{ARm+1}-E_{ARm})+F_b \quad (1)$$

$$F_{AB}=(F_A-F_B)\cdot(E_h-E_{ARm})/(E_{ARm+1}-E_{ARm})+F_B \quad (2)$$

wherein m is an integer smaller than j−1, electrical output values $E_{ARm}$, $E_{ARm+1}$, satisfy $E_{ARm} \leq E_h \leq E_{ARm+1}$, and $F_b$, $F_a$ are flow rate values on the calibration curve $T_n$ for the electrical output values $E_{ARm}$, $E_{ARm+1}$, respectively, and $F_B$, $F_A$ are flow rate values on the calibration curve $T_{n+1}$ for the electrical output values $E_{ARm}$, $E_{ARm+1}$ respectively,
and to achieve the corrected flow rate value $F_t$ corresponding to the measured electrical output value $E_h$ for the measured temperature value t by using the following equation (3):

$$F_t=(F_{ab}-F_{AB})\cdot(t-t_{n+1})/(t_n-t_{n+1})+F_{AB} \quad (3).$$

7. The thermal type flowmeter as claimed in claim 6, wherein said thermal type flow sensor has a fin plate that is projected into said fluid flow path and used for thermal interaction with the fluid.

8. The thermal type flowmeter as claimed in claim 6, wherein the fluid is a mixture comprising a plurality of molecules that have different molecular weights.

9. The thermal type flowmeter as claimed in claim 8, wherein the fluid is kerosene.

10. The thermal type flowmeter as claimed in claim 6, wherein the discrete temperature values are in the range from 14 to 16° C.

11. The thermal type flowmeter as claimed in claim 6, wherein said relationship graphically represents the plurality of predetermined calibration curves.

* * * * *

UNITED STATES PATENT AND TRADEMARK OFFICE
CERTIFICATE OF CORRECTION

PATENT NO. : 6,983,214 B2  
DATED : January 3, 2006  
INVENTOR(S) : Hiraizumi et al.

It is certified that error appears in the above-identified patent and that said Letters Patent is hereby corrected as shown below:

<u>Title page,</u>
Item [75], Inventors, add -- Kiyoshi Yamagishi, Saitama, Japan --.

Signed and Sealed this

Twenty-first Day of March, 2006

JON W. DUDAS  
*Director of the United States Patent and Trademark Office*